US012048675B2

(12) United States Patent
Vaughn

(10) Patent No.: US 12,048,675 B2
(45) Date of Patent: Jul. 30, 2024

(54) FEEDING DEVICE

(71) Applicant: Shanlynn Chanel Bejae Love Vaughn, Norfolk, VA (US)

(72) Inventor: Shanlynn Chanel Bejae Love Vaughn, Norfolk, VA (US)

( * ) Notice: Subject to any disclaimer, the term of this patent is extended or adjusted under 35 U.S.C. 154(b) by 0 days.

(21) Appl. No.: 17/826,338

(22) Filed: May 27, 2022

(65) Prior Publication Data

US 2022/0280393 A1 Sep. 8, 2022

Related U.S. Application Data

(63) Continuation-in-part of application No. 16/900,288, filed on Jun. 12, 2020, now Pat. No. 11,395,788.

(60) Provisional application No. 63/320,840, filed on Mar. 17, 2022, provisional application No. 62/902,740, filed on Sep. 19, 2019.

(51) Int. Cl.

| | |
|---|---|
| ***A47D 15/00*** | (2006.01) |
| ***A61J 9/00*** | (2006.01) |
| ***A61J 9/06*** | (2006.01) |
| ***A61J 11/00*** | (2006.01) |

(52) U.S. Cl.

CPC ............. *A61J 9/0607* (2015.05); *A61J 9/005* (2013.01); *A61J 9/0676* (2015.05); *A61J 11/005* (2013.01)

(58) Field of Classification Search

CPC ........ A61J 9/0607; A61J 9/005; A61J 9/0676; A61J 11/005; A61J 11/04; A61J 9/001

See application file for complete search history.

(56) References Cited

U.S. PATENT DOCUMENTS

| | | | | |
|---|---|---|---|---|
| 1,987,132 A * | 1/1935 | Shine .................... | A61J 9/0692 | 248/104 |
| D264,993 S | 6/1982 | Kestenberg | | |
| 5,086,517 A * | 2/1992 | Jones .................... | A61J 9/0676 | 2/104 |
| 5,791,503 A * | 8/1998 | Lyons ...................... | A61J 9/00 | 215/11.4 |
| 6,112,919 A * | 9/2000 | Ho ............................ | A61J 9/00 | 215/11.4 |
| 6,669,064 B2 * | 12/2003 | Perricone .............. | A61J 9/0676 | 248/104 |
| 6,681,944 B1 * | 1/2004 | Youssef ................ | A61J 11/005 | 215/11.1 |
| 6,793,094 B2 | 9/2004 | Turnbough | | |

(Continued)

FOREIGN PATENT DOCUMENTS

GB 2394183 A 4/2004

*Primary Examiner* — Amy J. Sterling

(74) *Attorney, Agent, or Firm* — DUANE MORRIS LLP

(57) ABSTRACT

A breastfeeding device is disclosed comprising a nipple, a housing, and one or more adjustable straps. The nipple is removably coupled to an amorphous liquid bag via a nozzle assembly. The housing comprises a protuberant portion having a first aperture, a back portion, and one or more fasteners. The protuberant portion and the back portion are removably attached to one another and form an interior cavity. The one or more fasteners are configured to removably attach the a protuberant portion to the back portion. The nipple is insertable into the first aperture of the protuberant portion and protrudes through the first aperture while the amorphous liquid bag remains within the interior cavity. The one or more adjustable straps are attached to the back portion.

20 Claims, 10 Drawing Sheets

(56) References Cited

U.S. PATENT DOCUMENTS

| | | | | |
|---|---|---|---|---|
| 7,044,316 | B1 * | 5/2006 | Hsu | A61J 11/0005 215/11.1 |
| 8,444,021 | B1 * | 5/2013 | Ferreiro | A45F 3/20 224/148.2 |
| 8,684,201 | B2 * | 4/2014 | Berkovitch | A61J 9/04 215/11.4 |
| 8,915,408 | B1 * | 12/2014 | Hill | A61J 9/0676 224/264 |
| 9,060,917 | B1 * | 6/2015 | Tronson | A61J 9/0676 |
| 10,028,891 | B2 * | 7/2018 | Luo | A61J 9/0623 |
| 10,058,481 | B1 * | 8/2018 | Russo | A61J 1/1481 |
| 10,842,719 | B1 * | 11/2020 | Picchetti | A61J 17/001 |
| 10,973,738 | B1 * | 4/2021 | Tronson | A61J 13/00 |
| 11,076,969 | B2 * | 8/2021 | Meikle | A61B 5/165 |
| 11,097,876 | B2 * | 8/2021 | Chalermwinsuekun | B65D 43/0231 |
| 11,253,433 | B2 * | 2/2022 | Davis | A61J 9/0638 |
| 11,395,788 | B2 * | 7/2022 | Vaughn | A61J 9/0607 |
| 2005/0087551 | A1 * | 4/2005 | Reid | A45F 3/20 222/160 |
| 2007/0163983 | A1 * | 7/2007 | Hsu | A61J 11/002 215/11.4 |
| 2009/0166481 | A1 * | 7/2009 | Chen | A61J 9/0607 215/11.1 |
| 2009/0261054 | A1 | 10/2009 | Shelby | |
| 2010/0258519 | A1 | 10/2010 | Shelby | |
| 2012/0234788 | A1 * | 9/2012 | Livingston | A61J 9/00 215/11.6 |
| 2013/0048671 | A1 * | 2/2013 | Braly | A45F 3/20 222/129 |
| 2013/0270140 | A1 | 10/2013 | Tronson | |
| 2015/0335533 | A1 * | 11/2015 | Pineda | A61J 11/002 215/11.1 |
| 2019/0060088 | A1 | 2/2019 | Meikle | |
| 2020/0060940 | A1 * | 2/2020 | Conneely | A61J 11/0005 |
| 2021/0361533 | A1 * | 11/2021 | Pineda | A61J 11/002 |

* cited by examiner

FEEDING DEVICE

CROSS-REFERENCE TO RELATED APPLICATIONS

This application is a continuation-in-part of U.S. Non-Provisional application Ser. No. 16/900,288, filed on Jun. 12, 2020, now U.S. Pat. No. 11,395,788, and entitled "FEEDING DEVICE", which is incorporated herein by reference in its entirety and claims priority from U.S. Provisional Patent Application Ser. No. 62/902,740, filed on Sep. 19, 2019. This application also claims priority under 35 U.S.C. § 119(e) from U.S. Provisional Patent Application Ser. No. 63/320,840, filed on Mar. 17, 2022 and entitled "FEEDING DEVICE", which is incorporated herein by reference in its entirety.

BACKGROUND

Many women around the world are unable to breastfeed their children. There are a number of reasons why a new mother would not be able to properly breastfeed their child. These reasons may include: lack of milk production, prior mastectomy, pain, issues with latching, nipple confusion, and lack of prenatal educational resources. These reasons lend themselves to a decline in infants getting the proper natural feeding experience. Currently, when parents are unable to breastfeed their children, they often turn to a feeding bottle, which has been the go-to breastfeeding substitute for years. Although the feeding bottle has been able to deliver milk to infants, it eliminates the benefits of skin-to-skin contact between a caregiver and infant. Additionally, it may promote nipple confusion and early emotional detachment. Skin-to-skin contact may aid in the feeding experience by stimulating bonding between the caregiver and infant, stabilizing an infant's natural breathing rhythm and heartbeat, and comforting infants with colic. Thus, there is a need for a more natural substitute to imitate the breastfeeding experience for caregivers who are unable to breastfeed their children (e.g., mothers unable to breastfeed for the reasons listed above, fathers, and adoptive parents).

SUMMARY

According to an aspect of the present disclosure, a breastfeeding device is provided. The breastfeeding device comprises a liquid pouch assembly, a silicone housing, a silicone areola, and an adjustable strap. The liquid pouch assembly comprises a nipple removably coupled to an amorphous liquid bag. The silicone housing comprises a silicone cup and a rear silicone component. The silicone cup includes a central hole. The silicone cup and the rear silicone component are attached to one another and form an interior cavity. An entrance to the cavity is formed at the top of the silicone cup and the rear silicone component, and the liquid pouch assembly is insertable through the entrance. The nipple of the liquid pouch assembly is insertable into the central hole of the silicone cup and protrudes through the central hole while the amorphous liquid bag remains within the interior cavity. The silicone areola is external to the silicone housing, and the silicone areola is removably coupled to the nipple and concentric with the central hole of the silicone cup. The adjustable strap is attached to opposing sides of the silicone housing at the attachment of the silicone cup and the rear silicone component. The adjustable strap comprises a first end, a second end, and a third end. The first and second ends of the adjustable strap are attached to a first side of the silicone housing and the third end of the adjustable strap is attached to a second side of the silicone housing. The first end of the adjustable strap is attached to the top half of the silicone housing, and the second end of the adjustable strap is attached to the bottom half of the silicone housing.

In some embodiments, the silicone areola is textured and colored to resemble an areola of a female breast. In some embodiments, the silicone housing is textured and colored to resemble a female breast. In some embodiments, the nipple is textured and colored to resemble a nipple of a female breast. In some embodiments, the nipple is removably coupled to the amorphous liquid bag via a screw mechanism. In some embodiments, the nipple is removably coupled to the amorphous liquid bag via a snap mechanism with a seal. In some embodiments, the liquid pouch assembly contains one of breast milk, formula, water, juice, and combinations thereof. In some embodiments, the silicone cup and the rear silicone component are attached to one another using a strong adhesive.

According to another aspect of the present disclosure, an infant feeding device is provided. The infant feeding device comprises a housing, a member, an amorphous receptacle for holding liquid, and an adjustable strap. The housing comprises a protuberant portion having a first aperture and a back portion. The housing defines an interior volume accessed via a closable opening in the housing. The member has a second aperture, and the member is fixedly attached to an external face of the first portion such that the first and second apertures are aligned. The amorphous receptacle is attached to a hollow nipple. When the receptacle is disposed within the interior volume, the nipple protrudes through the first and second apertures. The adjustable strap is attached to the housing to allow the infant feeding device to be carried at chest height of a user.

In some embodiments, the first portion is flexible. In some embodiments, the receptacle, when filled with a liquid, is placed within the interior volume, and the housing conforms to the shape of the fluid-filled receptacle. In some embodiments, the receptacle is placed within the interior volume via the closable opening. In some embodiments, the member is a different color than the external face of the first portion. In some embodiments, the member is a different texture than the external face of the first portion. In some embodiments, the strap has three ends. In some embodiments, the back portion is generally planar.

According to another aspect of the present disclosure, a breastfeeding device is provided. The breastfeeding device comprises a nipple, a housing, and one or more adjustable straps. The nipple is removably coupled to an amorphous liquid bag via a nozzle assembly. The housing comprises a protuberant portion having a first aperture, a back portion, and one or more fasteners. The protuberant portion and the back portion are removably attached to one another and form an interior cavity. The one or more fasteners are configured to removably attach the a protuberant portion to the back portion. The nipple is insertable into the first aperture of the protuberant portion and protrudes through the first aperture while the amorphous liquid bag remains within the interior cavity. The one or more adjustable straps are attached to the back portion.

In some embodiments, the one or more fasteners are laser cut and molded into or bonded onto a rim of the protuberant portion. In some embodiments, the protuberant portion is textured and colored to resemble a female breast. In some embodiments, the nipple is textured and colored to resemble a nipple of a female breast. In some embodiments, the back portion comprises one or more of an unbroken loop fabric (UBL), neoprene, and Veltex. In some embodiments, the one or more adjustable straps are coupled to one or more strap sliders. In some embodiments, the amorphous liquid bag contains one of breast milk, formula, water, juice, and combinations thereof. In some embodiments, the one or more fasteners comprise a hook portion of a hook-and-loop fastener.

According to another aspect of the present disclosure, an infant feeding device is provided. The infant feeding device comprises a housing, an amorphous receptacle for holding a liquid, and an adjustable strap attached to said housing to allow the infant feeding device to be carried at chest height of a user. The housing comprises a protuberant portion having a first aperture, a back portion, and one or more fasteners configured to attach the protuberant portion to the back portion. The housing defines an interior volume. The amorphous receptacle is attached to a hollow nipple via a nozzle assembly which, when said receptacle is disposed within the interior volume, the nipple protrudes through the first aperture.

In some embodiments, the protuberant portion is flexible. In some embodiments, the amorphous receptacle, when filled with a liquid, is placed within the interior volume, and the housing conforms to the shape of the fluid-filled amorphous receptacle. In some embodiments, the one or more fasteners comprise a hook portion of a hook-and-loop fastener. In some embodiments, the adjustable strap is coupled to one or more strap sliders configured to adjust the length of the adjustable strap. In some embodiments, the protuberant portion comprises silicone. In some embodiments, the adjustable strap has three ends. In some embodiments, the back portion is generally planar. In some embodiments, the back portion comprises a fabric material. In some embodiments, the nipple includes a plurality of holes. In some embodiments, the nipple comprises silicone. In some embodiments, the nipple and the protuberant portion comprise a single molded part.

BRIEF DESCRIPTION OF THE DRAWINGS

The following will be apparent from elements of the figures, which are provided for illustrative purposes.

Figure 1:
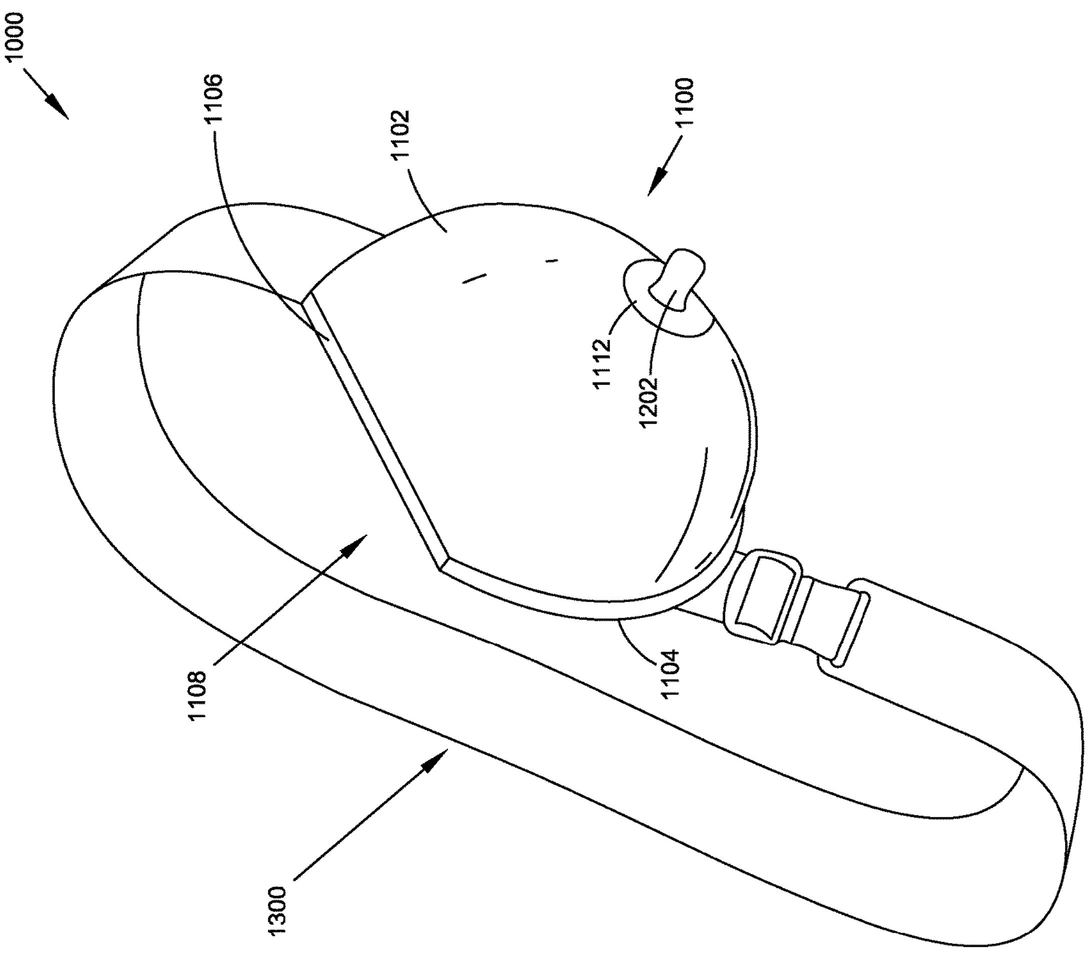
FIG. 1 is a schematic isometric view of an assembled breastfeeding device according to some embodiments of the present disclosure.

The present application discloses illustrative (i.e., example) embodiments. The claimed inventions are not limited to the illustrative embodiments. Therefore, many implementations of the claims will be different than the illustrative embodiments. Various modifications can be made to the claimed inventions without departing from the spirit and scope of the disclosure. The claims are intended to cover implementations with such modifications.

DETAILED DESCRIPTION

For the purposes of promoting an understanding of the principles of the disclosure, reference will now be made to a number of illustrative embodiments in the drawings and specific language will be used to describe the same.

Various aspects of the present disclosure will be or will become apparent to one of skill in the art by reference to the following detailed description when considered in connection with the accompanying exemplary non-limiting embodiments.

A child's mouth is naturally designed to fit around the nipple of a mother's breast, which looks and feels different from the nipples (e.g., on feeding bottles) on the market today. The present invention provides a breastfeeding device for infants that facilitates a more natural feeding experience than a feeding bottle would and enables caregivers to bond more closely with infants through simulated skin-to-skin contact.

Figure 2:
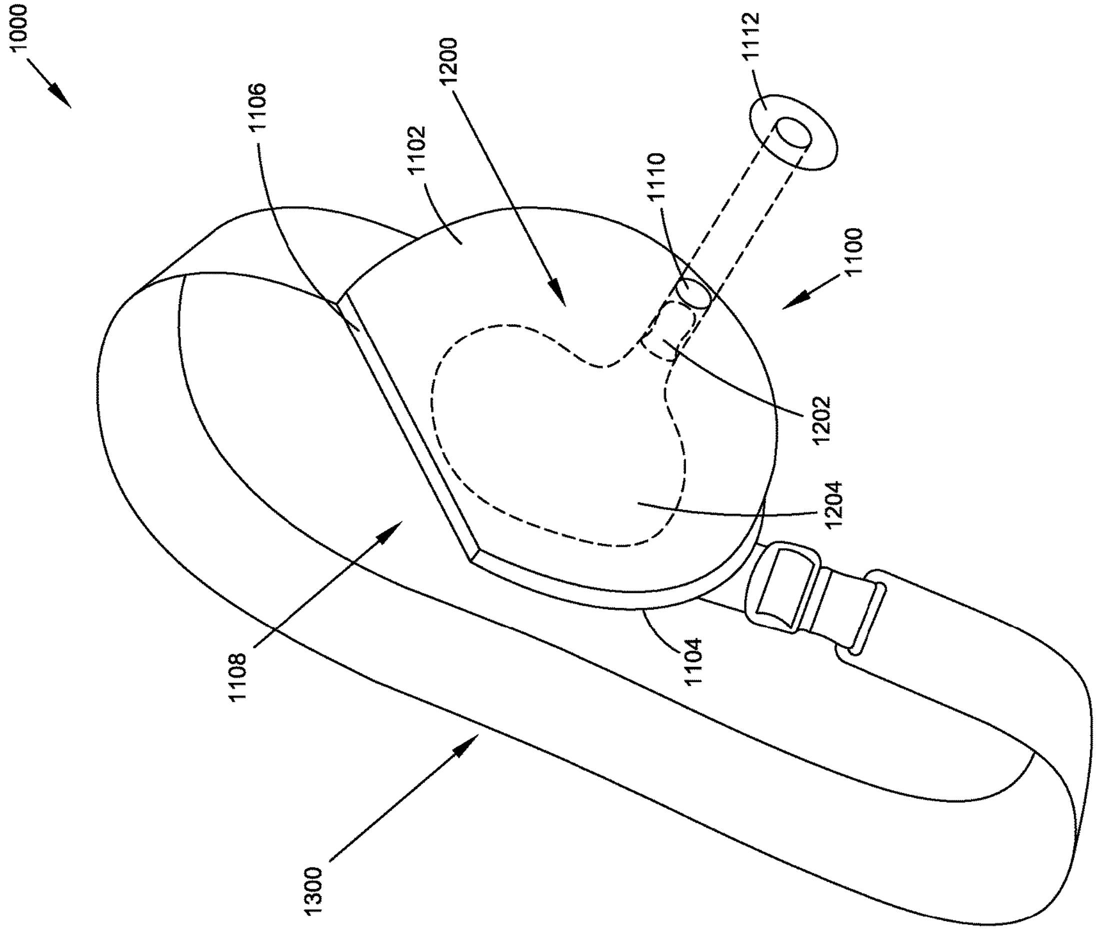
FIG. 2 illustrates a schematic partially-exploded view of a breastfeeding device according to some embodiments of the present disclosure.

FIG. 1 illustrates an embodiment of an assembled breastfeeding device 1000, and FIG. 2 illustrates a partially-exploded view of the breastfeeding device 1000 of FIG. 1. The breastfeeding device 1000 may also be referred to as an infant feeding device. According to some embodiments, the breastfeeding device 1000 resembles the shape, touch, and feel of a female human breast. Further, the breastfeeding device 1000 has the same contours of a female human breast. The breastfeeding device 1000 may comprise a housing 1100, and in some embodiments, the housing may be made of silicone to recreate the feel of a mother's breast. The housing 1100 may comprise a protuberant portion 1102 and a back portion 1104. The protuberant portion 1102 and the back portion 1104 may be attached using, e.g., an adhesive, glue, snaps, clasps, a hook-and-loop fastener, etc. In an embodiment, the attachment between the protuberant portion and the back portion may have a permanent section and a releasable section which allows access to an interior cavity 1106 between the protuberant portion and the back portion. In some embodiments, the protuberant portion 1102 is flexible. In some embodiments, the back portion 1104 may be made of breathable cotton or another cloth material for ease of use and comfort of the user as back portion 1104 rests on a user's chest. The breathable cotton material may make the back portion 1104 absorbent of sweat from the user and condensation from the liquid inside the amorphous liquid bag 1204. In some embodiments, the back portion 1104 is generally planar. In some embodiments, protuberant portion 1102 may be a silicone cup, and the back portion 1104 may be a rear silicone component or other material with a cotton cover over the side that contacts the user.

The housing 1100 may be textured and colored to resemble a female breast. The color may be tailored to match a variety of diverse skin tones so that a user (e.g., caregiver such as a biological parent or adoptive parent) may use a breastfeeding device 1000 that matches their skin tone. The protuberant portion 1102 and the back portion 1104 are attached to one another and form an interior cavity 1106. In some embodiments, the protuberant portion 1102 and the back portion 1104 may be attached to one another using a strong adhesive. The protuberant portion 1102 may include a central hole 1110 (shown in FIG. 2). The central hole 1110 may also be referred to as an aperture. An entrance 1108 to the interior cavity 1106 may be formed at the top of the protuberant portion 1102 and the back portion 1104. Entrance 1108 may be a closable opening. Interior cavity 1106 may also be referred to as an interior volume that may be accessed via a closable opening in the housing 1100 and that is defined by the housing 1100.

The breastfeeding device 1000 may further comprise a member 1112 external to the housing 1100. The member 1112 includes an aperture. In some embodiments, member 1112 may be a silicone areola. In some embodiments, the silicone material used for the areola may be stiffer than a silicone material used for the protuberant portion 1102. Member 1112 helps an infant latch onto the breastfeeding device 1000 more easily. In some embodiments, the member 1112 may be fixedly or removably attached to an external face of the protuberant portion 1102 such that the central hole 1110 and the aperture of the member 1112 are aligned. The member 1112 may be removably attached to the external face of the protuberant portion for cleaning purposes. The member 1112 may be textured and colored to resemble an areola of a female human breast. The member 1112 may be a different color and/or different texture than the external face of the protuberant portion 1102.

As illustrated in FIG. 2, the breastfeeding device 1000 may further comprise a liquid pouch assembly 1200 (shown within the interior cavity 1106) comprising a nipple 1202 that may be removably coupled to an amorphous liquid bag 1204. The nipple 1202 and amorphous liquid bag 1204 may be connected to one another through a detachable connector piece (not shown) for easy cleaning and assembly. The connector piece may be circular and may be made of plastic or a similar material. The connector piece may couple the nipple 1202 to the amorphous liquid bag 1204 via a locking mechanism for leak-proof assurance. The nipple 1202 is implemented for releasing the liquid housed inside the amorphous liquid bag 1204 to an infant. In some embodiments, the liquid pouch assembly 1200 may be kept at a specific temperature to resemble the body temperature of a human. The nipple 1202 may be textured and colored to resemble a nipple of a female human breast. The nipple 1202 and the amorphous liquid bag 1204 may be removably coupled to one another so that both components are washable and reusable. In some embodiments, the amorphous liquid bag 1204 may be disposable. The amorphous liquid bag 1204 may be referred to as an amorphous receptacle for holding a liquid.

In some embodiments, the liquid pouch assembly 1200 may contain one of breast milk, formula, water, juice, and combinations thereof. In some embodiments, when the amorphous liquid bag 1204 is filled with a liquid and placed within the interior cavity 1106, the housing 1100 may conform to the shape of the amorphous liquid bag 1204. In some embodiments, the amorphous liquid bag 1204 may be oval shaped. In some embodiments, the amorphous liquid bag 1204 may hold up to 10 ounces of liquid. In some embodiments, the amorphous liquid bag 1204 may be strong enough to hold any type of liquid necessary for feeding an infant. In some embodiments, the nipple 1202 may be removably coupled to the amorphous liquid bag 1204 via a screw mechanism or a snap mechanism with a seal. The nipple 1202 may be a hollow nipple. In some embodiments, the nipple 1202 may include a plurality of holes (e.g. 4 holes) for even milk distribution. The inventor has identified that having more than one hole makes for even milk distribution, which tends to eliminate gas accumulation and paces the child's eating rhythm.

The liquid pouch assembly 1200 may be insertable into the interior cavity 1106 through the entrance 1108. The nipple 1202 may be insertable into the central hole 1110 of the protuberant portion 1102 and may protrude through the central hole 1110 while the amorphous bag 1204 remains within the interior cavity 1106. The nipple 1202 may be attached to the protuberant portion 1102 via a snap mechanism. As shown in FIG. 1, when the breastfeeding device 1000 is assembled with the liquid pouch assembly 1200 disposed within the interior cavity 1106, the nipple 1202 may protrude through both the central hole 1110 and the aperture of the member 1112. As shown in FIG. 2, the member 1112 may be removably coupled to the external surface of the protuberant portion 1102 and the nipple 1202 and may be concentric with the central hole 1110 of the protuberant portion 1102. The member 1112 may secure the nipple 1202 to the external surface of the protuberant portion 1102 so that the nipple does not slip beneath the external surface of the protuberant portion during feeding.

The breastfeeding device 1000 may further comprise an adjustable strap 1300 attached to opposing sides of the housing 1100 at the attachment of the protuberant portion

Figure 3:
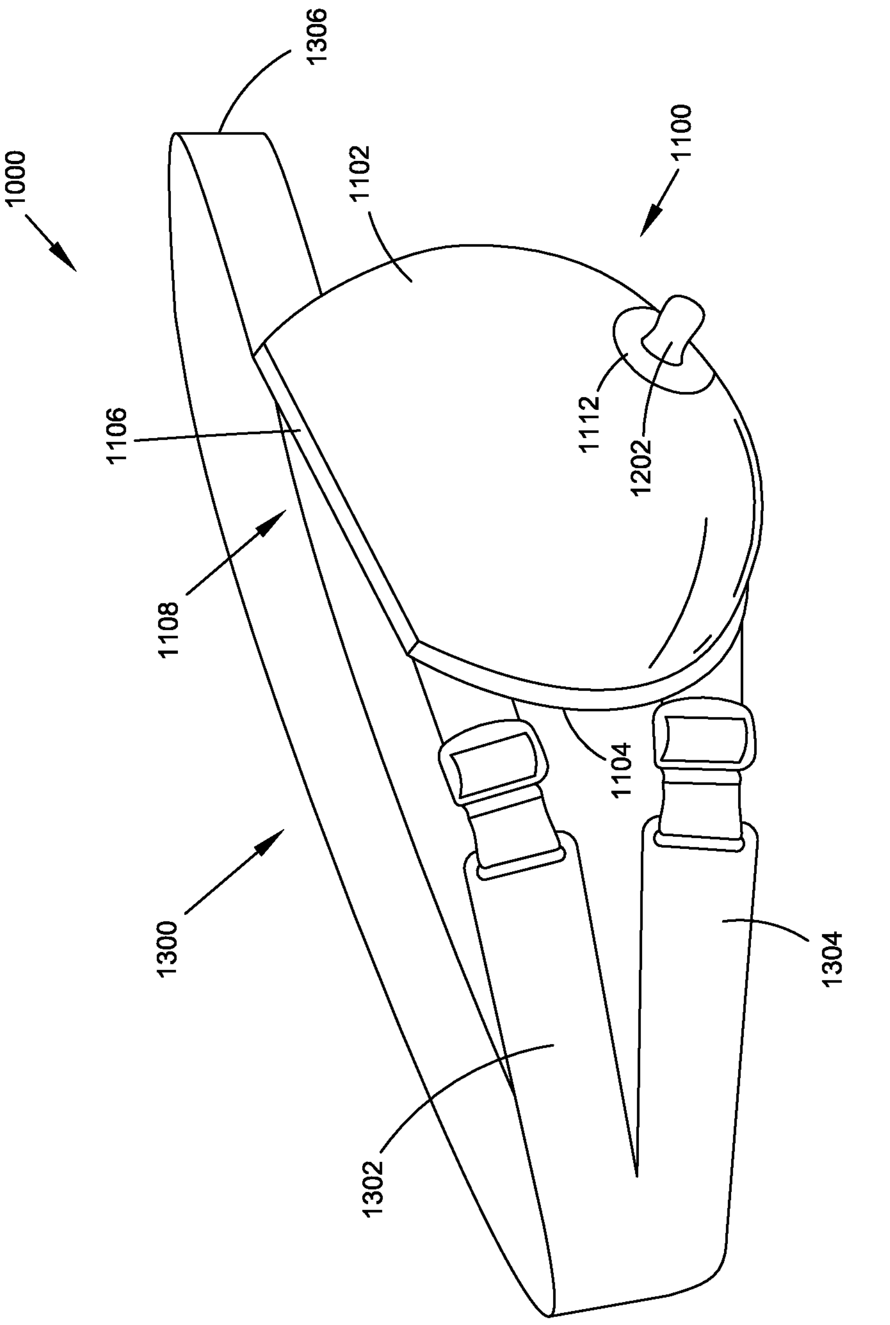
FIG. 3 illustrates a schematic isometric view of an assembled breastfeeding device according to some embodiments of the present disclosure.

1102 and the back portion 1104. The adjustable strap 1300 may be used to fix the breastfeeding device 1000 to the user. The adjustable strap 1300 may allow the breastfeeding device 1000 to be carried at the chest height of a user when the strap is placed around a user's shoulder and chest. The adjustable strap 1300 may also allow for a user to feed an infant hands-free. In some embodiments, the adjustable strap may be an elastic strap. The adjustable strap 1300 may be adjusted to fit different positions and user sizes. FIG. 3 illustrates an embodiment of an assembled breastfeeding device 1000 where the adjustable strap 1300 comprises a first end 1302, a second end 1304, and a third end 1306. The first end 1302 and second end 1304 may be attached to a first side of the housing 1100, and the third end 1306 may be attached to a second side of the housing 1100. The first end 1302 may be attached to the top half of the housing 1100, and the second end 1304 may be attached to the bottom half of the housing 1100. In some embodiments, the breastfeeding device 1000 may comprise two or more adjustable straps 1300. This may allow the user to secure the breastfeeding device like a baby carrier with two or more adjustable straps 1300 around their back. In some embodiments, the adjustable straps 1300 may be padded for user comfort.

Figure 4:
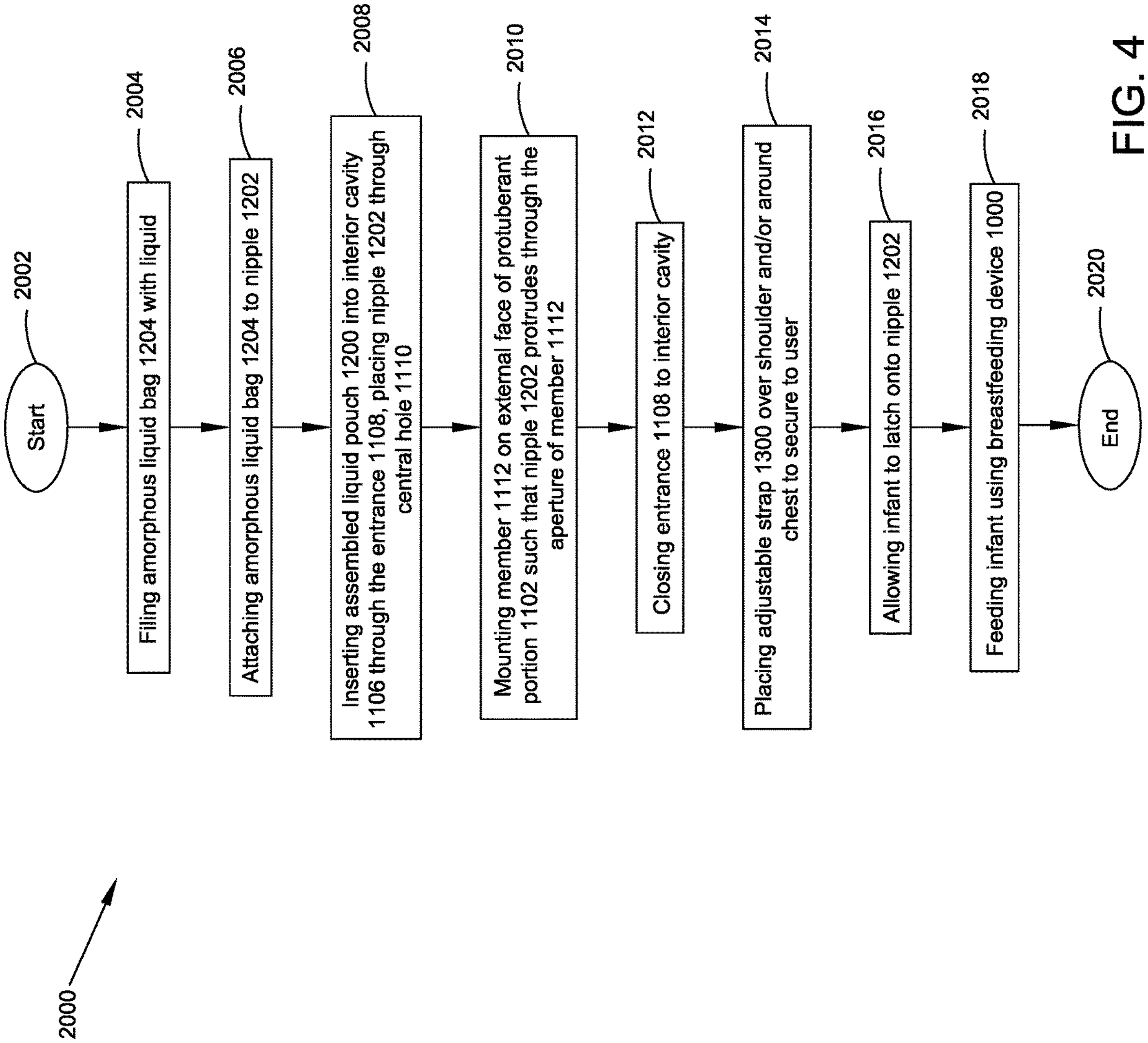
FIG. 4 illustrates a method of using the breastfeeding device to feed an infant according to some embodiments of the present disclosure.

FIG. 4 illustrates an exemplary feeding method 2000 for using the breastfeeding device 1000 to feed an infant. Depending on the desired use of the device 1000, some of the steps below may be unnecessary and therefore omitted. Feeding method 2000 begins at step 2002. At step 2004, a user may fill the amorphous liquid bag 1204 with a liquid they intend to feed to an infant. At step 2006, the user may attach the amorphous liquid bag 1204 to the nipple 1202. At step 2008, the user may insert the assembled liquid pouch assembly 1200 into the interior cavity 1106 through the entrance 1108, placing the nipple 1202 through the central hole 1110. At step 2010, the user may mount member 1112 on the external face of the protuberant portion 1102 such that the nipple 1202 protrudes through the aperture of member 1112. The user may then secure the nipple 1202 to the protuberant portion 1102 using the member 1112. At step, 2012, the user may close the entrance 1108 to the interior cavity 1106. At step 2014, the user may place the adjustable strap 1300 over his or her shoulder and/or around his or her chest to secure the breastfeeding device 1000 to the user. In an embodiment, the back portion 1104 will rest on his or her chest.

In operation, at step 2016, the user may allow the infant to latch onto the nipple 1202. At step 2018, the user may feed the infant using the breastfeeding device 1000. Method 2000 ends at step 2020. After implementing method 2000 to feed an infant, the user may disassemble the breastfeeding device 1000 to clean it.

Figure 5B:
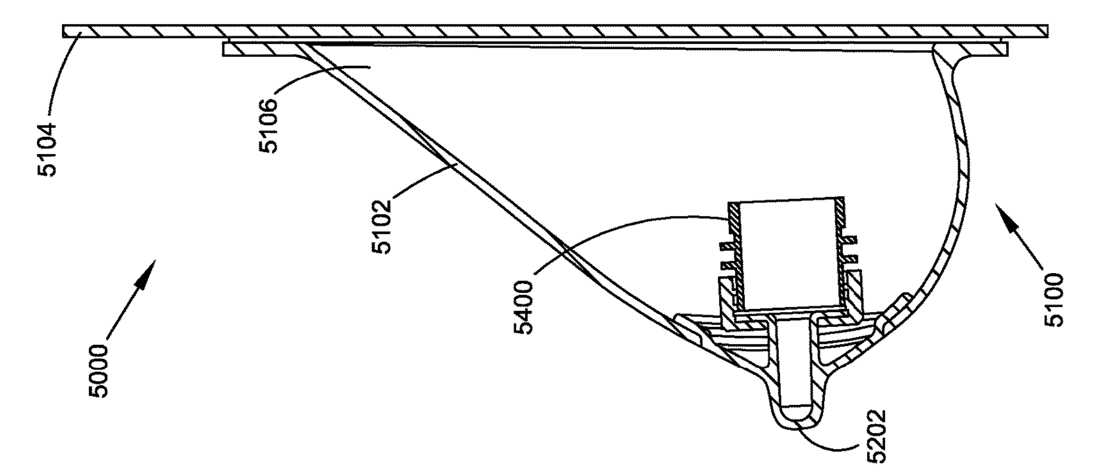
FIG. 5B illustrates a cross-sectional view of a partially assembled breastfeeding device taken along line A-A in FIG. 5A according to some embodiments of the present disclosure.
Figure 5A:
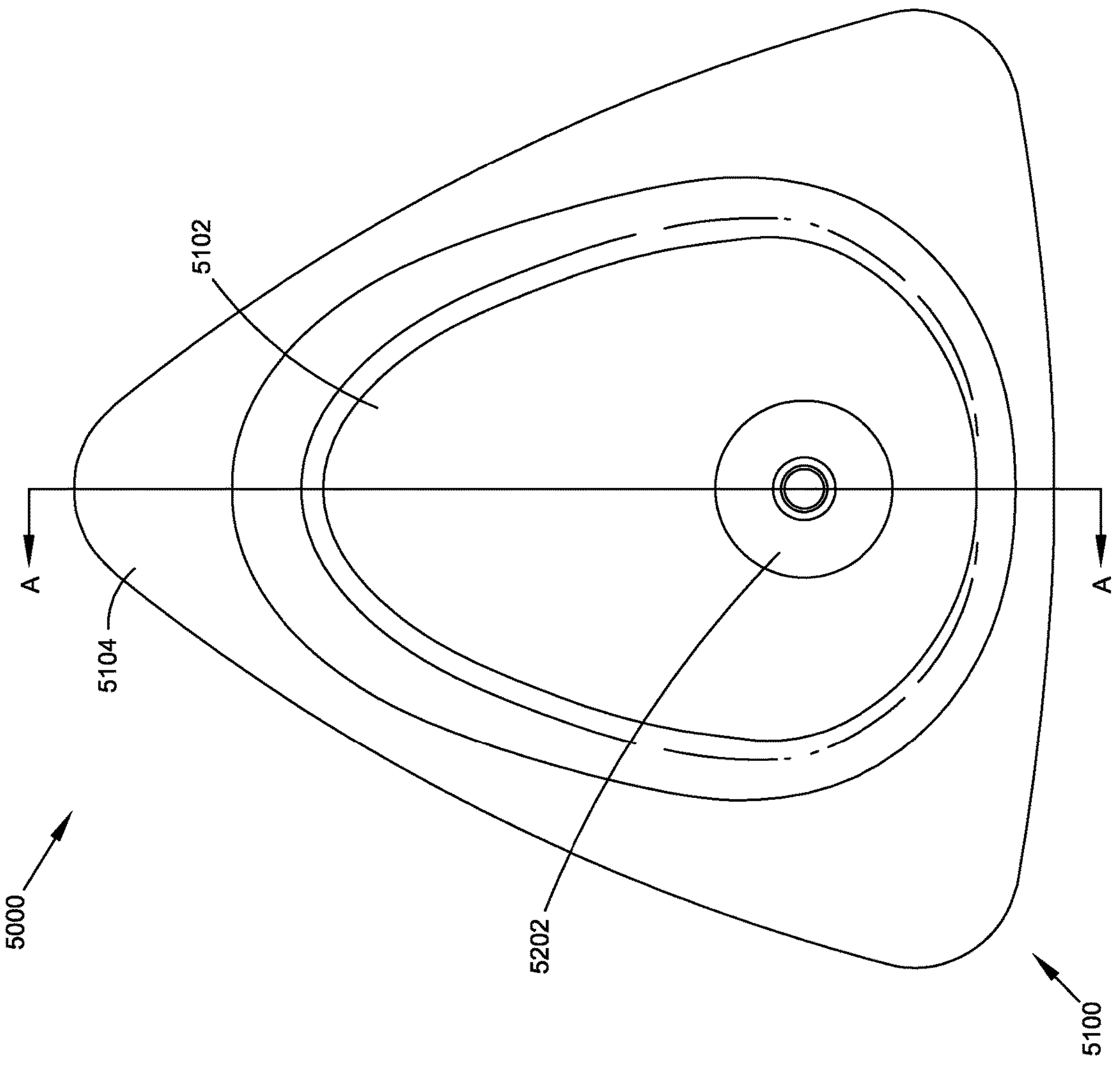
FIG. 5A illustrates a front view of a partially assembled breastfeeding device according to some embodiments of the present disclosure.

FIGS. 5A and 5B illustrate a partially assembled breastfeeding device 5000 according to some embodiments of the present disclosure. The breastfeeding device 5000 may also be referred to as an infant feeding device. According to some embodiments, the breastfeeding device 5000 resembles the shape, touch, and feel of a female human breast. Further, the breastfeeding device 5000 has the same contours of a female human breast. The breastfeeding device 5000 may comprise a housing 5100. The housing 5100 may comprise a protuberant portion 5102, a fabric back portion 5104, and one or more fasteners 5114 configured to attach the protuberant portion 5102 to the fabric back portion 5104. The housing 5100 defines an interior volume. The protuberant portion 5102 includes an aperture 5110 configured to receive a nipple 5202. In some embodiments, the protuberant portion 5102 may be made of silicone. In some embodiments, the protuberant portion 5102 may be flexible. In some embodiments, the protuberant portion 5102 may be textured and colored to resemble a female breast. In some embodiments, the fabric back portion 5104 is generally planar.

Figure 6A:
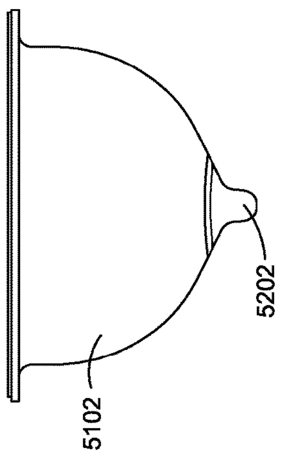
FIG. 6A illustrates a top view of a partially assembled breastfeeding device according to some embodiments of the present disclosure.
Figure 6B:
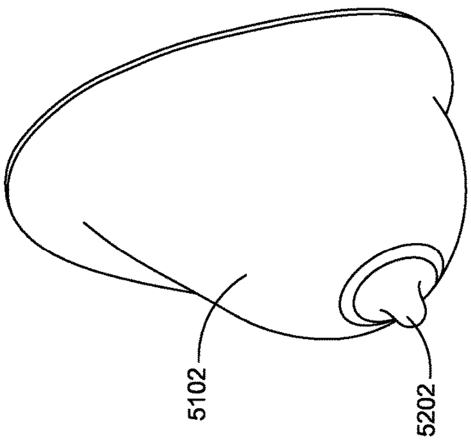
FIG. 6B illustrates a front isometric view of a partially assembled breastfeeding device according to some embodiments of the present disclosure.
Figure 6C:
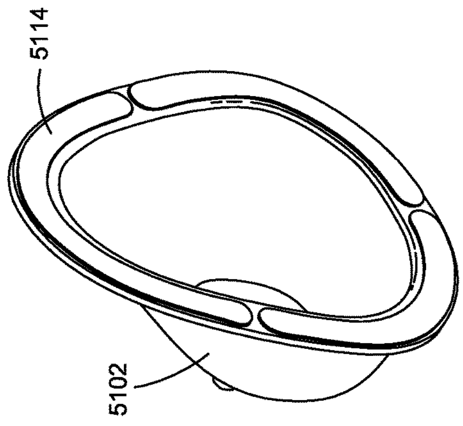
FIG. 6C illustrates a rear isometric view of a partially assembled breastfeeding device according to some embodiments of the present disclosure.
Figure 6D:
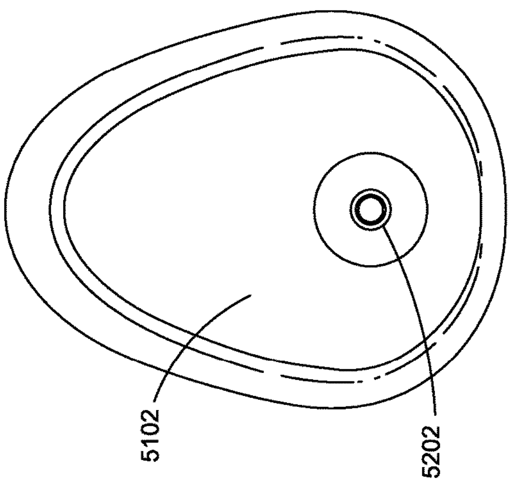
FIG. 6D illustrates a front view of a partially assembled breastfeeding device according to some embodiments of the present disclosure.
Figure 6E:
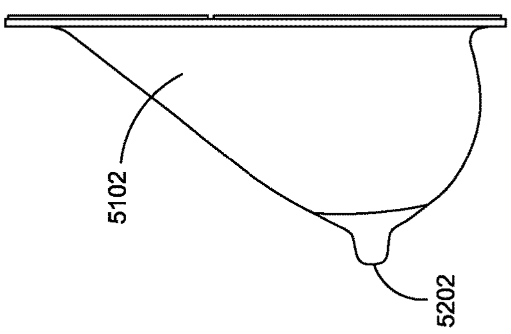
FIG. 6E illustrates a side view of a partially assembled breastfeeding device according to some embodiments of the present disclosure.
Figure 6F:
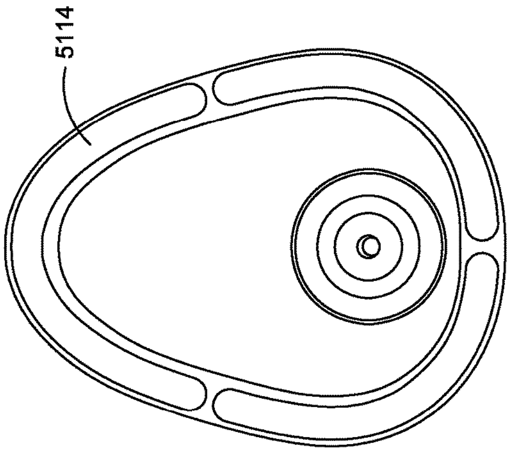
FIG. 6F illustrates a rear view of a partially assembled breastfeeding device according to some embodiments of the present disclosure.

The breastfeeding device 5000 may further comprise an amorphous liquid bag (not shown) and a nipple 5202 attached to a nozzle assembly 5400. The nozzle assembly 5400 may removably couple the nipple 5202 to an amorphous liquid bag (not shown) configured to house a liquid. The amorphous liquid bag may be referred to as an amorphous receptacle for holding a liquid. In some embodiments, the liquid may be one of breast milk, formula, water, juice, and combinations thereof. In some embodiments, the amorphous liquid bag, when filled with a liquid, is placed within the interior cavity 5106 (also referred to as the interior volume), and the housing 5100 conforms to the shape of the fluid-filled amorphous liquid bag. In some embodiments, the nipple may be made of silicone. In some embodiments, the nipple 5202 may be textured and colored to resemble a nipple of a female breast. The nipple 5202 may be a hollow nipple. In some embodiments, the nipple 5202 may include a plurality of holes. FIG. 8 shows the nipple 5202 and protuberant portion 5102 as separate parts; however, in some embodiments, the nipple 5202 and protuberant portion 5102 may be a single molded part. The protuberant portion 5102 is configured to house the nozzle assembly 5400 and amorphous liquid bag. The protuberant portion 5102 may be removably attached to a fabric back portion 5104 via one or more fasteners 5114 (e.g., a hook-and-loop fastener such as Velcro®) to form an interior cavity 5106 (shown in FIG. 5B). In a fully assembled breastfeeding device 5000 (e.g., in FIGS. 7A and 7B), the nipple 5202 may be insertable into the aperture 5110 of the protuberant portion 5102 and may protrude through the aperture 5110 while the amorphous liquid bag remains within the interior cavity. An exemplary fastener configuration on the breast is illustrated in FIGS. 6C and 6F. The breastfeeding device 5000 may further comprise straps 5300 (shown in FIGS. 7A, 7B, and 8) attached to fabric back portion 5104.

FIGS. 6A-6F illustrate different views of a partially assembled breastfeeding device 5000 comprising a nipple 5202, a protuberant portion 5102, and fasteners 5114 (e.g., the hook portion of a hook-and-loop fastener, such as Velcro® hooks). In some embodiments, Velcro® hooks may be molded into the protuberant portion 5102 (e.g., a silicone breast), as shown in FIGS. 6C and 6F.

Figure 7B:
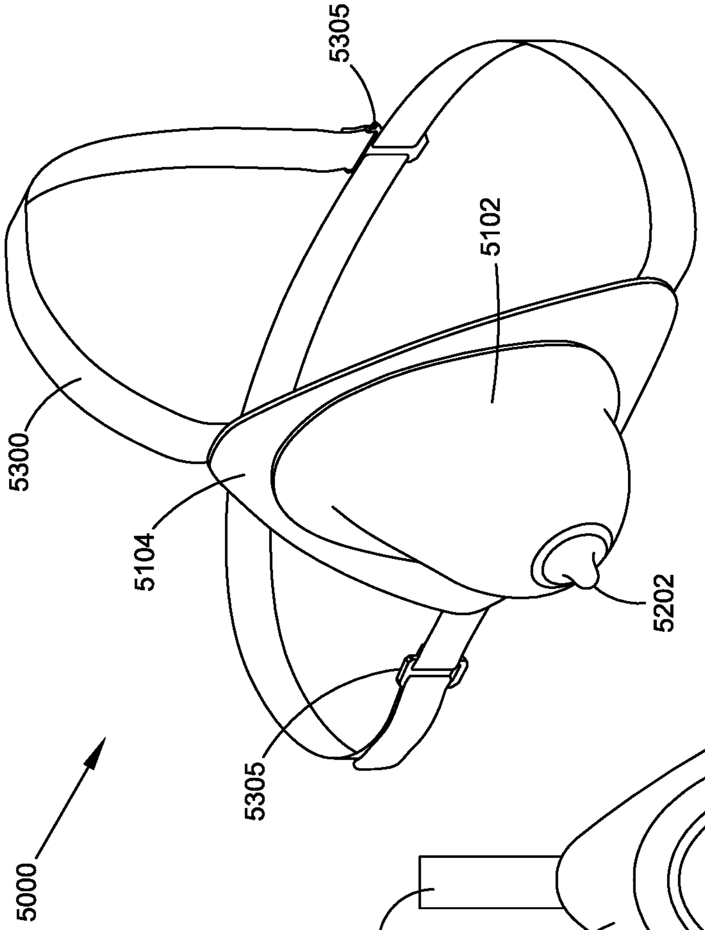
FIG. 7B illustrates a front isometric view of a fully assembled breastfeeding device according to some embodiments of the present disclosure.
Figure 7A:
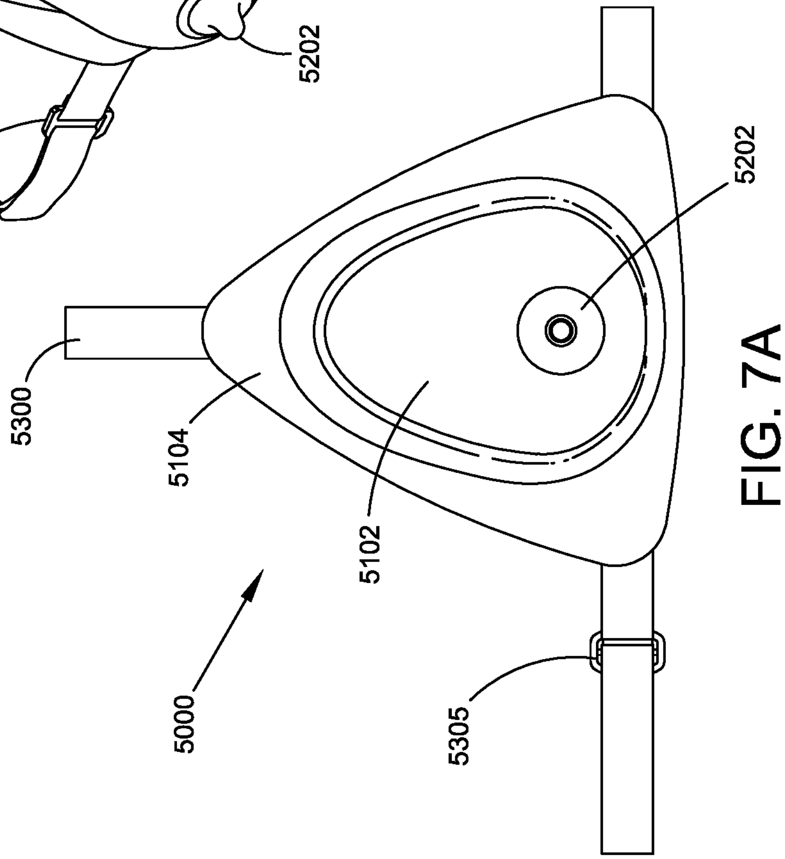
FIG. 7A illustrates a front view of a fully assembled breastfeeding device according to some embodiments of the present disclosure.
Figure 8:
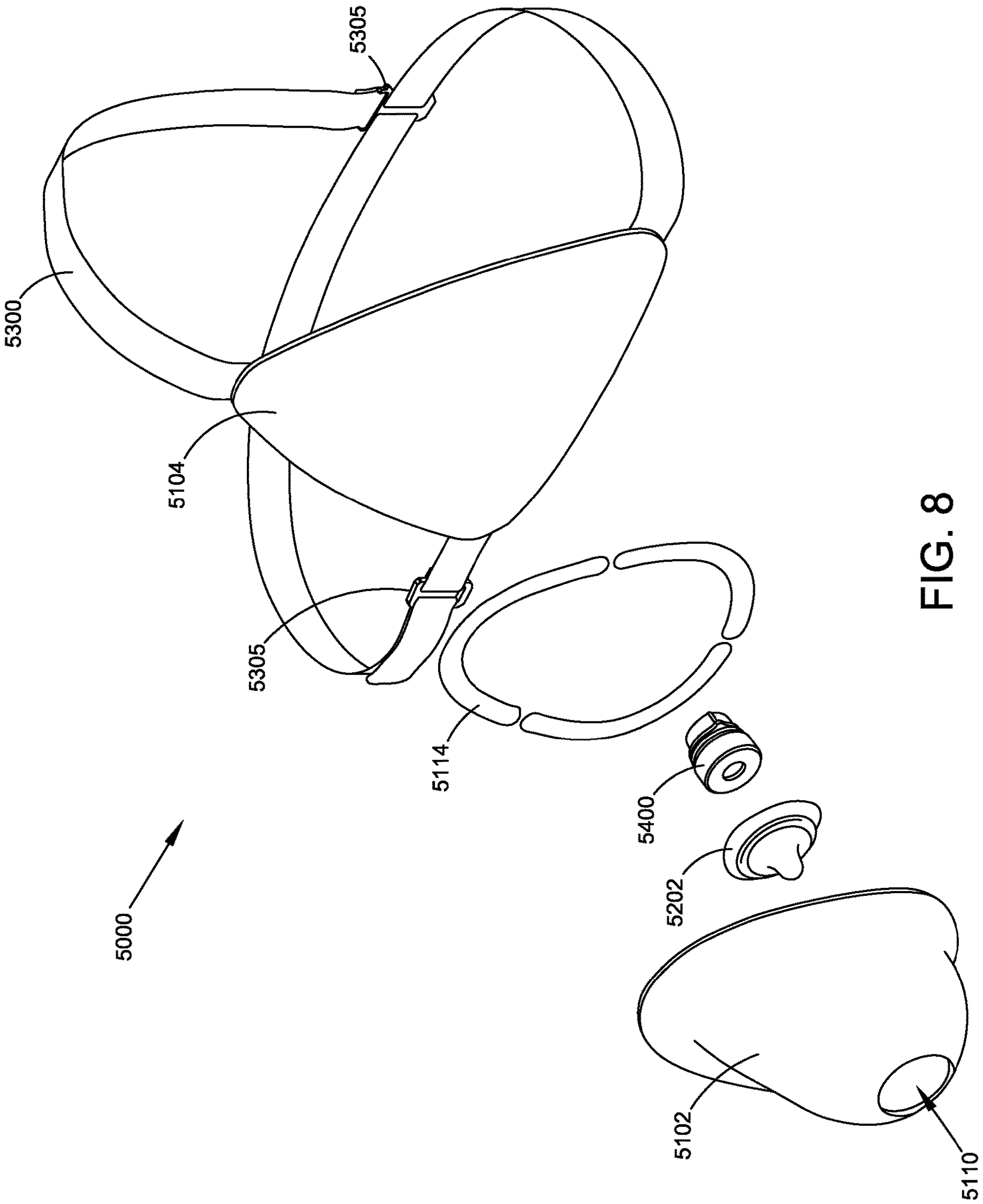
FIG. 8 illustrates an exploded view of a breastfeeding device according to some embodiments of the present disclosure.
Figure 9A:
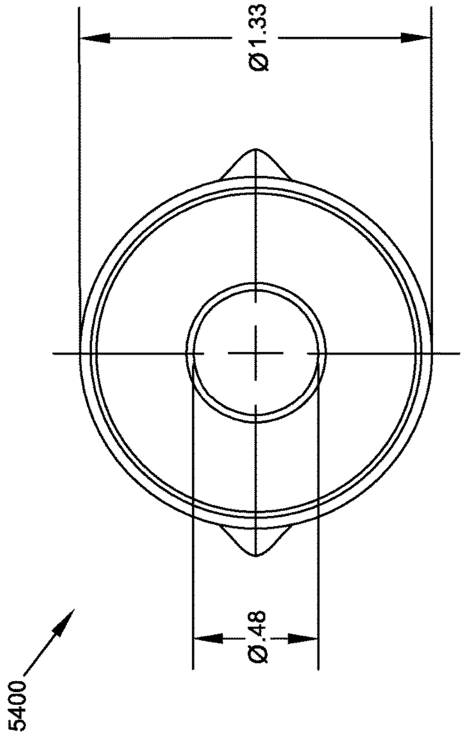
FIG. 9A illustrates a top view of a nozzle assembly of a breastfeeding device according to some embodiments of the present disclosure.
Figure 9B:
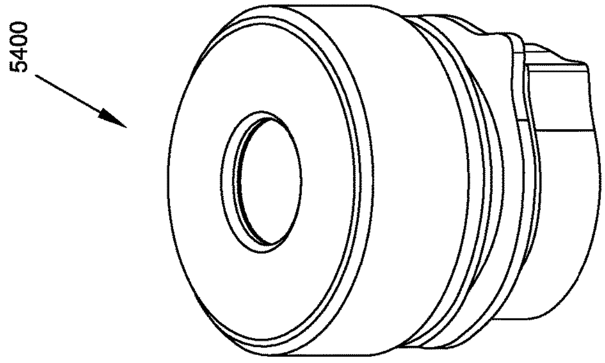
FIG. 9B illustrates an isometric view of a nozzle assembly of a breastfeeding device according to some embodiments of the present disclosure.
Figure 9C:
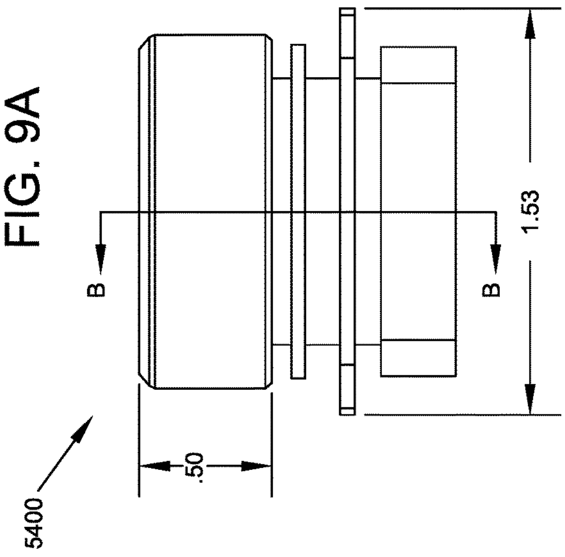
FIG. 9C illustrates a side view of a nozzle assembly of a breastfeeding device according to some embodiments of the present disclosure.
Figure 9D:
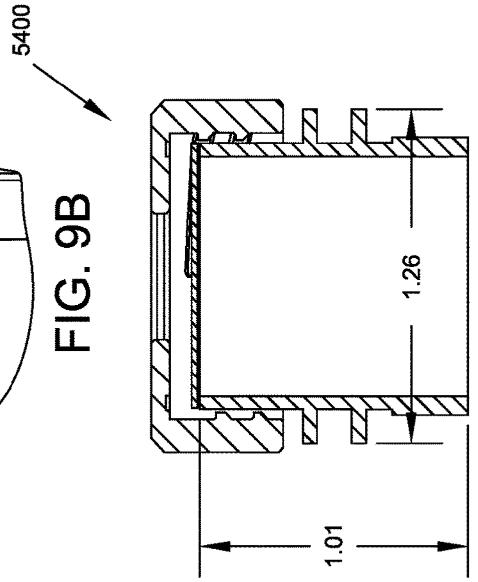
FIG. 9D illustrates a cross-sectional view of a nozzle assembly of a breastfeeding device taken along line B-B in FIG. 9C according to some embodiments of the present disclosure.

FIGS. 7A and 7B illustrate different views of a fully assembled breastfeeding device 5000. The fully assembled breastfeeding device 5000 comprises a nipple 5202, a protuberant portion 5102, a fabric back portion 5104, and straps 5300. The straps 5300 are attached to the fabric back portion 5104 to allow the breastfeeding device 5000 to be carried at chest height of a user. In some embodiments, the straps 5300 may be adjustable via straps slides 5305. In some embodiments, a strap 5300 has three ends. The fully assembled breastfeeding device 5000 further comprises an amorphous liquid bag (not shown) and fasteners 5114 (not shown).

FIG. 8 illustrates an exploded view of a breastfeeding device 5000. In some embodiments, the nozzle assembly 5400 may comprise a 3D printed cap. The nozzle assembly 5400 is configured to attach the amorphous liquid bag (not shown) to the nipple 5202. In some embodiments, the fasteners 5114 (e.g., Velcro hooks) may be laser cut and molded into or bonded onto the rim of the protuberant portion 5102. In some embodiments, the fabric back portion 5104 may comprise one or more of an unbroken loop fabric (UBL), neoprene, and Veltex®. In some embodiments, the straps 5300 may comprise webbing. In some embodiments, the straps 5300 may be coupled to one or more strap sliders 5305 that enable the straps 5300 to have adjustable lengths.

FIGS. 9A-9D illustrate exemplary dimensions for the nozzle assembly 5400 of the breastfeeding device 5000. The dimensions listed in FIGS. 9A-9D are shown in inches. In some embodiments, the nozzle assembly 5400 comprises a cap and a base, both of which include a hole as shown, e.g., in FIG. 9A, preferably through the middle of the cap and base. In some embodiments, the nozzle assembly 5400 interfaces with a tube (not shown) that fits through the hole in the nozzle assembly 5400 and connects with the amorphous liquid bag at one end of the tube and the nipple 5202 at the other end of the tube. In some embodiments, a first tube connects between the nozzle assembly 5400 and the amorphous liquid bag and a second tube connects between the nozzle assembly 5400 and the nipple 5202. In some embodiments, the tube and/or the nipple may be cleaned with a brush. In some embodiments, the cap helps secure the nozzle assembly 5400 to the tube or tubes. In some embodiments the cap is removable, which allows for easier cleaning of the nozzle assembly 5400. In some embodiments, the cap and the base of the nozzle assembly 5400 interface tightly to prevent leakage of liquid inside the nozzle assembly 5400.

Figure 10:
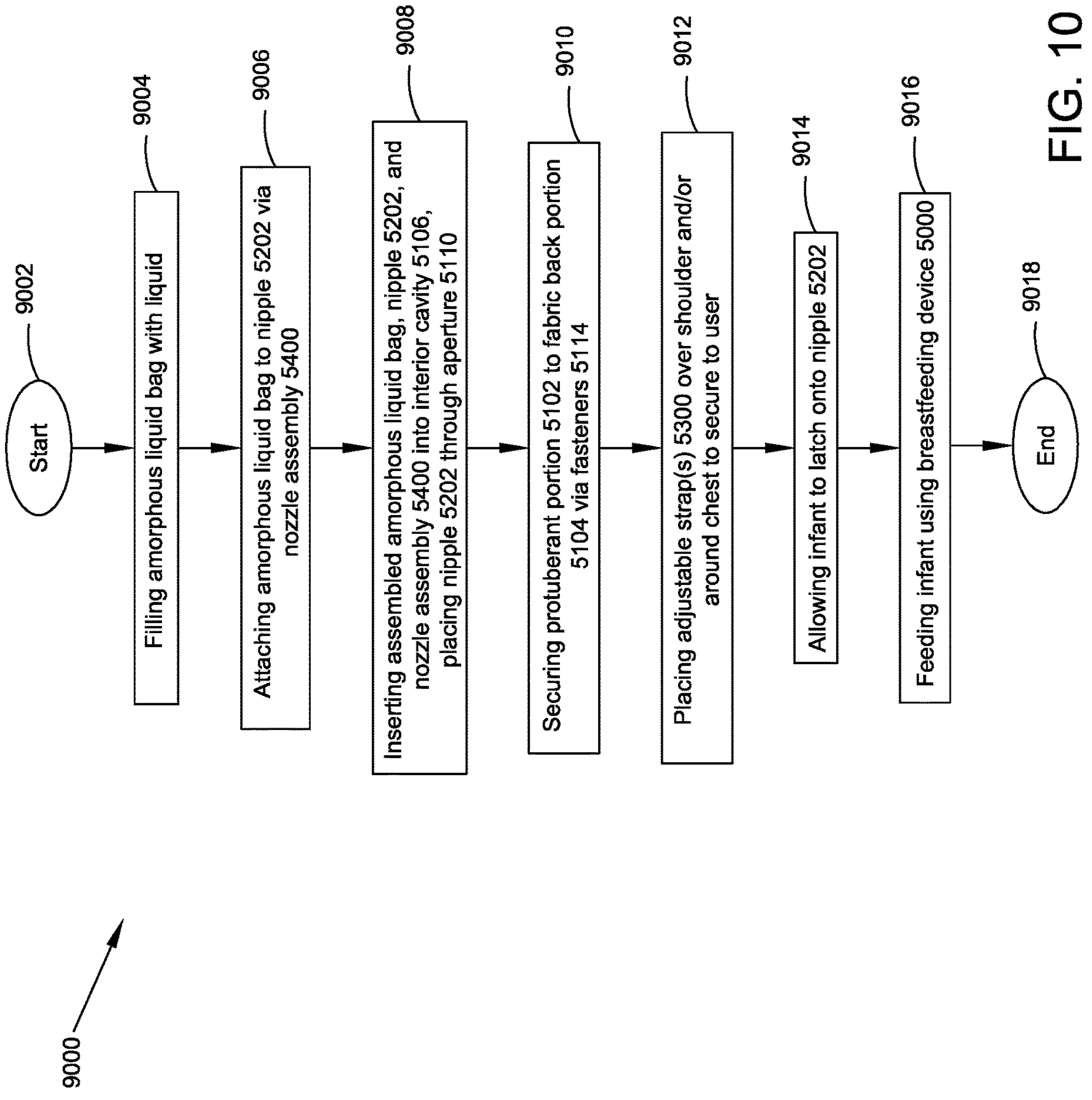
FIG. 10 illustrates a method of using the breastfeeding device to feed an infant according to some embodiments of the present disclosure.

FIG. 10 illustrates an exemplary feeding method 9000 for using the breastfeeding device 5000 to feed an infant. Depending on the desired use of the device 5000, some of the steps below may be unnecessary and therefore omitted. Feeding method 9000 begins at step 9002. At step 9004, a user may fill the amorphous liquid bag with a liquid they intend to feed to an infant. At step 9006, the user may attach the amorphous liquid bag to the nipple 5202 via the nozzle assembly 5400. At step 9008, the user may insert the assembled amorphous liquid bag, nipple 5202, and nozzle assembly 5400 into the interior cavity 5106, placing the nipple 5202 through the aperture 5110. At step 9010, the user may secure the protuberant portion 5102 to the fabric back portion 5104 via fasteners 5114. At step 9012, the user may place the adjustable strap(s) 5300 over his or her shoulder and/or around his or her chest to secure the breastfeeding device 5000 to the user. In an embodiment, the back portion 5104 will rest on his or her chest.

In operation, at step 9014, the user may allow the infant to latch onto the nipple 5202. At step 9016, the user may feed the infant using the breastfeeding device 5000. Method 2000 ends at step 9018. After implementing method 9000 to feed an infant, the user may disassemble the breastfeeding device 5000 to clean it.

The invention claimed is:

1. A breastfeeding device comprising:
a nipple removably coupled to an amorphous liquid bag via a nozzle assembly;
a member defining an aperture;
a housing comprising:
a protuberant portion having a central hole;
a back portion, wherein the protuberant portion and the back portion are removably attached to one another and form an interior cavity; and
one or more fasteners configured to removably attach the protuberant portion to the back portion;
wherein the member is removably attached to the protuberant portion and the aperture of the member is configured to align with the central hole of the protuberant portion, and wherein the nipple is insertable into the aperture of the member and the central hole of the protuberant portion and protrudes through the aperture and central hole while the amorphous liquid bag remains within the interior cavity; and
one or more adjustable straps attached to the back portion.

2. The breastfeeding device of claim 1 wherein the one or more fasteners are laser cut and molded into or bonded onto a rim of the protuberant portion.

3. The breastfeeding device of claim 1 wherein the protuberant portion is textured and colored to resemble a female breast.

4. The breastfeeding device of claim 1 wherein the nipple is textured and colored to resemble a nipple of a female breast.

5. The breastfeeding device of claim 1 wherein the back portion comprises one or more of an unbroken loop fabric (UBL), neoprene, and Veltex.

6. The breastfeeding device of claim 1 wherein the one or more adjustable straps are coupled to one or more strap sliders.

7. The breastfeeding device of claim 1 wherein the amorphous liquid bag contains one of breast milk, formula, water, juice, and combinations thereof.

8. The breastfeeding device of claim 1 wherein the one or more fasteners comprise a hook portion of a hook-and-loop fastener.

9. An infant feeding device comprising:
a housing comprising:
a protuberant portion having a central hole;
a back portion; and
one or more fasteners configured to removably attach the protuberant portion to the back portion,
said housing defining an interior volume;
a member defining an aperture, wherein the member is removably attached to the protuberant portion, and wherein the aperture of the member is configured to align with the central hole of the protuberant portion;
an amorphous receptacle for holding a liquid, said receptacle being attached to a hollow nipple via a nozzle assembly which, when said receptacle is disposed within the interior volume, the nipple protrudes through the aperture of the member and the central opening of the protuberant portion; and
an adjustable strap attached to said back portion to allow the infant feeding device to be carried at chest height of a user.

10. The infant feeding device of claim 9 wherein the protuberant portion is flexible.

11. The infant feeding device of claim 9 wherein the amorphous receptacle, when filled with a liquid, is placed within the interior volume, and the housing conforms to the shape of the fluid-filled amorphous receptacle.

12. The infant feeding device of claim 9 wherein the one or more fasteners comprise a hook portion of a hook-and-loop fastener.

13. The infant feeding device of claim 9 wherein the adjustable strap is coupled to one or more strap sliders configured to adjust the length of the adjustable strap.

14. The infant feeding device of claim 9 wherein the protuberant portion comprises a first silicone material and the member comprises a second silicone material, and wherein the second silicone material of the member is stiffer than the first silicone material of the protuberant portion.

15. The infant feeding device of claim 9 wherein the adjustable strap has three ends.

16. The infant feeding device of claim 9 wherein the back portion is generally planar.

17. The infant feeding device of claim 9 wherein the back portion comprises a fabric material.

18. The infant feeding device of claim 9 wherein the nipple includes a plurality of holes.

19. The infant feeding device of claim 9 wherein the nipple comprises silicone.

20. The infant feeding device of claim 9 wherein the nipple and the protuberant portion comprise a single molded part.

* * * * *